US012584441B2

(12) United States Patent
Michaud et al.

(10) Patent No.: US 12,584,441 B2
(45) Date of Patent: Mar. 24, 2026

(54) SELF-CONTAINED HYBRID TURBINE ENGINE

(71) Applicant: SAFRAN ELECTRICAL & POWER, Blagnac Cedex (FR)

(72) Inventors: Benoît Lucien Michaud, Moissy-Cramayel (FR); Philippe Delbosc, Moissy-Cramayel (FR)

(73) Assignee: SAFRAN ELECTRICAL & POWER, Blagnac Cedex (FR)

( * ) Notice: Subject to any disclaimer, the term of this patent is extended or adjusted under 35 U.S.C. 154(b) by 0 days.

(21) Appl. No.: 18/880,705

(22) PCT Filed: Jun. 28, 2023

(86) PCT No.: PCT/FR2023/050980
§ 371 (c)(1),
(2) Date: Jan. 2, 2025

(87) PCT Pub. No.: WO2024/009020
PCT Pub. Date: Jan. 11, 2024

(65) Prior Publication Data
US 2026/0002470 A1    Jan. 1, 2026

(30) Foreign Application Priority Data
Jul. 5, 2022    (FR) ...................................... 2206866

(51) Int. Cl.
*F02C 6/14*          (2006.01)
*B64D 27/33*        (2024.01)
(Continued)

(52) U.S. Cl.
CPC ................. *F02C 6/14* (2013.01); *H02J 7/345* (2013.01); *B64D 27/33* (2024.01); *F01D 15/10* (2013.01);
(Continued)

(58) Field of Classification Search
CPC ..... B64D 27/33; B64D 41/00; F05D 2260/42; F02C 6/14; F01D 15/10; H02J 7/345; H02J 15/00; H02J 50/05; H02J 3/28
See application file for complete search history.

(56) References Cited

U.S. PATENT DOCUMENTS 9,982,606 B2 *   5/2018  Veilleux, Jr. .............. H02J 4/00
2015/0249362 A1   9/2015  Bridgelall et al.
(Continued)

FOREIGN PATENT DOCUMENTS

EP          3633160 A2     4/2020

OTHER PUBLICATIONS

International Search Report in corresponding PCT Application No. PCT/FR2023/050980, mailed Oct. 20, 2023, 2 pages.

*Primary Examiner* — Phutthiwat Wongwian
*Assistant Examiner* — Roberto Toshiharu Igue
(74) *Attorney, Agent, or Firm* — Cozen O'Connor

(57)          ABSTRACT

A twin-spool turbine engine has a low-pressure turbine connected to a low-pressure compressor by a rotating low-pressure shaft, a high-pressure turbine connected to a high-pressure compressor by a rotating high-pressure shaft, and a mechanical power feed device on at least one of the rotating shafts. The turbine engine also includes capacitive components adapted to supply the turbine engine with electrical energy through the mechanical power feed device, the capacitive components being arranged on the turbine engine or on a support structure of the turbine engine and being arranged to form at least one pair of concentric circles centered on a main axis of the turbine engine, the circles of capacitive components being radially close to one another.

10 Claims, 3 Drawing Sheets

(51) Int. Cl.

| | | |
|---|---|---|
| *F01D 15/10* | (2006.01) |
| *H02J 7/34* | (2006.01) |
| *H02J 15/00* | (2026.01) |
| *H02J 50/05* | (2016.01) |

(52) U.S. Cl.
CPC ........... *F05D 2260/42* (2013.01); *H02J 15/00* (2013.01); *H02J 50/05* (2016.02)

(56) References Cited

U.S. PATENT DOCUMENTS

| | | |
|---|---|---|
| 2016/0096632 A1 | 4/2016 | Veilleux, Jr. et al. |
| 2020/0392859 A1* | 12/2020 | Turner ...................... F02K 5/00 |

* cited by examiner

SELF-CONTAINED HYBRID TURBINE ENGINE

CROSS-REFERENCE TO RELATED APPLICATIONS

This application is a US National phase application of PCT/FR2023/050980 filed Jun. 28, 2023, which claims priority to French Patent Application No. 2206866 filed Jul. 5, 2022, both of which are hereby incorporated in their entirety.

TECHNICAL FIELD OF THE INVENTION

The field of the invention is that of aeronautical turbine engines, and in particular that of aircraft engines produced in the form of twin-spool turbofans. More particularly, the invention relates to a self-contained hybrid turbine engine of this type, for aircraft.

PRIOR ART

Thermal/electric hybridization of an aircraft turbine engine provides a new path towards improving the behavior and performance of these turbine engines.

This hybridization consists of feeding or extracting mechanical power at certain times and at a certain level, through electrical machines installed on the rotating shafts of the turbine engine.

A key requirement of conventional turbine engines for aircraft propulsion is to guarantee a maximum rise time that is not to be exceeded, between an idle speed where the engine only generates a low thrust and a maximum speed where the engine thrust is at its maximum.

A conventional twin-spool, turbofan type of turbine engine is schematically represented in FIG. 1. It conventionally comprises, from upstream to downstream in the direction of the gas flow, a fan S, a low-pressure compressor 1, a high-pressure compressor 2, a combustion chamber 3 which receives a flow of fuel Qc, a high-pressure turbine 4, a low-pressure turbine 5, and a primary exhaust nozzle 6.

Low-pressure compressor 1 and low-pressure turbine 5 are connected by a low-pressure shaft 10, and together form a low-pressure body.

High-pressure compressor 2 and high-pressure turbine 4 are connected by a high-pressure shaft 9, and together with the combustion chamber form a high-pressure body.

Fan S, which is driven by low-pressure shaft 10, either directly or via a reduction gearbox, compresses the air coming from the air inlet. This air is divided, downstream of fan S, into a secondary air flow which is guided directly towards a secondary nozzle (not shown) through which it is ejected to contribute to the thrust provided by the turbine engine, and a so-called primary flow which enters the gas generator consisting of the low- and high-pressure bodies, then is ejected into primary nozzle 6.

Conventionally, it is known to install electric generators in the turbine engine in order to power the onboard electrical system. These generators are driven by high pressure shaft 9 via an accessory gearbox, in order to convert the mechanical energy into electrical energy intended for the secondary systems on board the aircraft.

One variant may consist of replacing at least one of the electric generators with at least one starter for starting up the turbine engine using electrical energy. Startup is achieved by controlling the electric starter via a converter located either in the engine zone or in the cockpit zone, powered by a source external to the turbine engine to be started. This source may be either a ground-based power unit or another onboard electrical source that has been previously activated (auxiliary power generator, electrical generator of other turbine engines). Once the turbine engine has started up, the electric starter changes mode to operate exclusively as an electrical generator.

However, the use of such a system to assist the turbine engine by supplying a significant amount of electrical energy is not always satisfactory, because it requires the use of a high-capacity electrical energy source located within the aircraft area as well as associated electrical connections, which generates significant bulk and high electrical losses.

SUMMARY

The invention aims to overcome these disadvantages by providing a self-contained hybrid turbine engine. For this purpose, the invention relates to a twin-spool turbofan type of turbine engine for an aircraft, comprising a low-pressure compressor, a high-pressure compressor, a combustion chamber, a high-pressure turbine, and a low-pressure turbine, said low-pressure turbine being connected to said low-pressure compressor by a rotating low-pressure shaft and said high-pressure turbine being connected to said high-pressure compressor by a rotating high-pressure shaft, the turbine engine also comprising a mechanical power feed device on at least one of said rotating shafts, characterized in that the turbine engine comprises capacitive components adapted to supply the turbine engine with electrical energy through said mechanical power feed device, said capacitive components being arranged on the turbine engine or on a support structure of the turbine engine and being arranged to form at least one pair of concentric circles, said pairs of circles being centered on a main axis of the turbine engine, the circles of a same pair of circles of capacitive components being radially close to one another.

The capacitive components may in particular form two pairs of circles spaced axially apart from one another.

Said support structure may be a nacelle receiving the turbine engine.

Such a turbine engine allows self-contained hybrid operation, with the capability of storing energy in electrical and/or electrochemical form and of restoring energy to the propulsion system, being arranged in the vicinity of the nacelle in order to limit the bulk and mass of the connections as well as electrical losses.

The power feed device may advantageously also function as an electric generator.

The capacitive components may be supercapacitors, in particular carbon nanotube supercapacitors.

Such capacitive components have a low internal resistance, making it possible to deliver high power for a short time, and thus to assist with propulsion during critical phases such as aircraft takeoff.

The power supplied may be for example on the order of 500 KW, delivered for a duration of around one second.

Alternatively, the supercapacitors may be electrochemical double layer supercapacitors (also called EDLCs), or hybrid supercapacitors (also called LICs, for Lithium Ion Capacitor).

The capacitive components may be connected in series and have an equivalent resistance that is less than or equal to 100 μOhm per capacitive component.

Such a feature makes it possible to keep the voltage at which electrical energy is restored at 400 V or above for the required time.

For each pair of circles of capacitive components, the capacitive components of a radially inner circle may be arranged so as to be circumferentially offset by half the circumferential width of the capacitive components, relative to the capacitive components of a radially outer circle.

Such an arrangement makes it possible to reduce the length of the connections between the capacitive components, by arranging the connectors of the capacitive components of the two circles so that they are radially in line with each other.

Each capacitive component may comprise an input connector and an output connector which are arranged on a same axial connection face of the capacitive component, the connection faces of the components of a same pair of circles being oriented in a same axial direction.

Such an arrangement allows further reducing the lengths of the connections between the capacitive components.

For each pair of concentric circles of capacitive components, the input and output connectors of each component of each of the circles are respectively connected to output and input connectors of components of the other circle, with the exception of a first component and a last component of the pair of circles.

Such an arrangement allows connecting in series all capacitive components of the two circles, with connections having a short total length.

The turbine engine may comprise two pairs of circles of capacitive components, the connection faces of the capacitive components of each pair of circles being arranged facing the connection faces of the capacitive components of the other pair of circles.

Such an arrangement allows a simple connection in series of the components of the two pairs of circles, and also allows reducing the magnetic field effects generated by the flow of electric current in the interconnections.

The turbine engine may comprise two pairs of concentric circles of capacitive components, the components of the two pairs of circles being connected together in series.

The interconnection between the two pairs of circles may be adapted to be electrically connected to an aircraft body in order to create a potential reference, and/or be connected to an aircraft electrical system in order to serve as a ground reference.

The pairs of circles of capacitive components may be connected to one another in parallel.

Such a feature makes it possible for the system to be compatible with a 540V (+/−270V) system or with a 230/400 VAC system with fixed or variable frequency.

In this case, the pairs of circles may be successively offset in order to continue to ensure the effect of canceling out the magnetic fields between the various interconnections of the capacitive components.

The invention also relates to a propulsion assembly comprising a turbine engine as above and at least one nacelle receiving the turbine engine, the capacitive components being arranged in a space delimited radially between an inner casing and an outer casing of the nacelle.

The arrangement of the capacitive components in the nacelle makes it possible to benefit from an advantageous thermal environment and to have a short distance between the components and the power feed device.

DETAILED DESCRIPTION OF THE INVENTION

Figure 1:
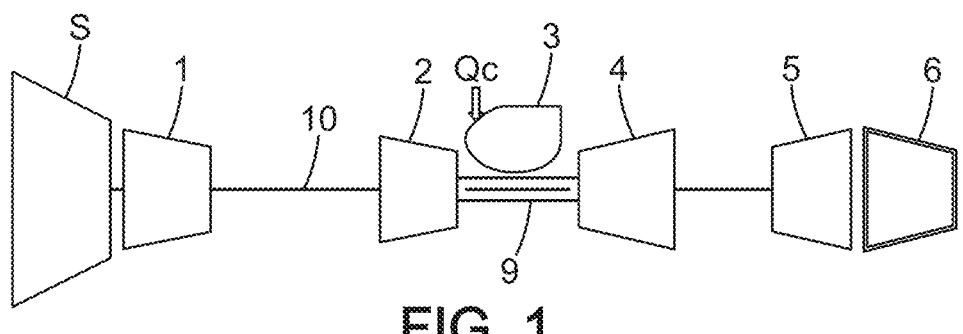
FIG. 1 is a schematic representation of a twin-spool turbofan type of turbine engine according to the state of the art.
Figure 2:
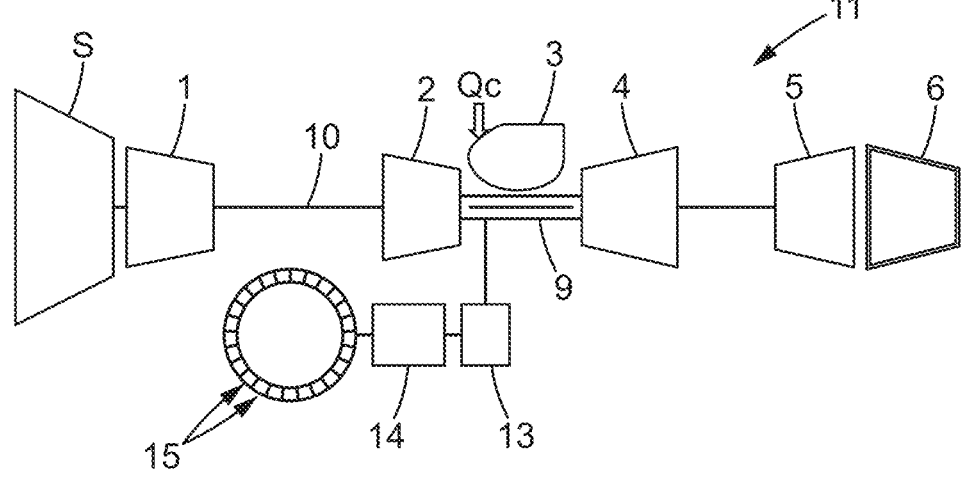
FIG. 2 is a schematic representation of a turbine engine according to the invention.

FIG. 2 shows a turbine engine 11 according to the invention, installed on an aircraft. Turbine engine 11, similarly to the one in FIG. 1, comprises from upstream to downstream in the direction of the gas flow, a fan S, a low-pressure compressor 1, a high-pressure compressor 2, a combustion chamber 3 which receives a flow of fuel Qc, a high-pressure turbine 4, a low-pressure turbine 5, and a primary exhaust nozzle 6.

Low-pressure compressor 1 and low-pressure turbine 5 are connected by a low-pressure shaft 10, and together form a low-pressure body.

High-pressure compressor 2 and high-pressure turbine 4 are connected by a high-pressure shaft 9, and together with combustion chamber 3 form a high-pressure body.

Fan S, which is driven by low pressure shaft 10, either directly or via a reduction gearbox, compresses the air coming from the air inlet. This air is divided downstream of fan S into a secondary air flow which is guided directly towards a secondary nozzle (not shown) through which it is ejected to contribute to the thrust provided by the turbine engine, and a so-called primary flow which enters the gas generator consisting of the low and high pressure bodies, then is ejected into primary nozzle 6.

Turbine engine 11 also comprises a mechanical power feed device 13 combined with high pressure shaft 9. Mechanical power feed device 13 is capable of converting electrical power into mechanical power contributing to the rotation of high pressure shaft 9, and conversely is capable of taking mechanical power from high pressure shaft 9 to convert it into electrical power for storage and/or to supply power to loads 12 of the aircraft.

Feed device 13 is in particular capable of alternately operating as an electric motor and as a generator, depending on the flight phases of the aircraft, and of taking mechanical power from high-pressure shaft 9 to convert it into electrical power.

Feed device 13 is for example connected to the low-pressure shaft by an accessory gearbox (not shown) which engages with high-pressure shaft 9.

Turbine engine 11 also comprises an electrical energy storage assembly, said assembly comprising a power converter 14 and a plurality of capacitive-type energy storage elements 15. Energy storage elements 15 are in particular supercapacitors, for example carbon nanotube supercapacitors.

A typical order of magnitude of startup assistance for a turbine engine is to supply power on the order of 500 KW for a duration of about 1 s, the total energy supplied therefore being on the order of 500 kJ. In this case, the capacity design of the supercapacitor-based storage assembly is defined both by the power density of the capacitive components and by the energy density they store.

In this respect, supercapacitors made with carbon nanotubes and graphene make it possible to increase the electrical conductivity and thus to divide the resistivity of the components by 10 (or more), which allows the storage system to be adapted to operating cycles of around a second (instead of 10 to 20 seconds for conventional supercapacitors).

The storage assembly comprises for example 296 carbon nanotube supercapacitors of 900 F capacitance, connected in series, which makes it possible to obtain an equivalent series resistance (ESR) of less than 100 µOhms per component.

Figure 3:
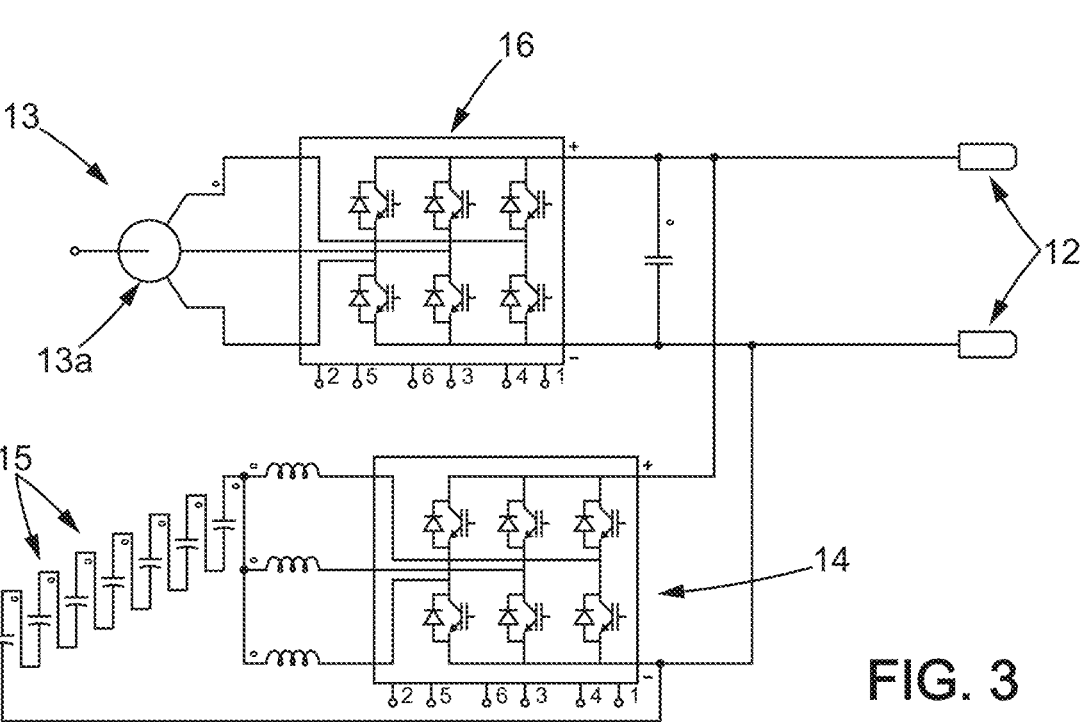
FIG. 3 is an electrical diagram of an energy storage assembly of the turbine engine of FIG. 2.

The energy storage assembly is schematically represented in FIG. 3, which shows the electrical architecture of said assembly. Feed device 13 conventionally comprises an electric machine 13a and an inverter 16, the latter being connected in parallel to power converter 14, here a DC/DC converter.

Converter 14, which is a chopper type of converter, is configured to control the power taken from or fed to high-pressure shaft 9 or delivered to loads 12.

The energy storage assembly is also connected in parallel to loads 12 of the aircraft.

Figure 4:
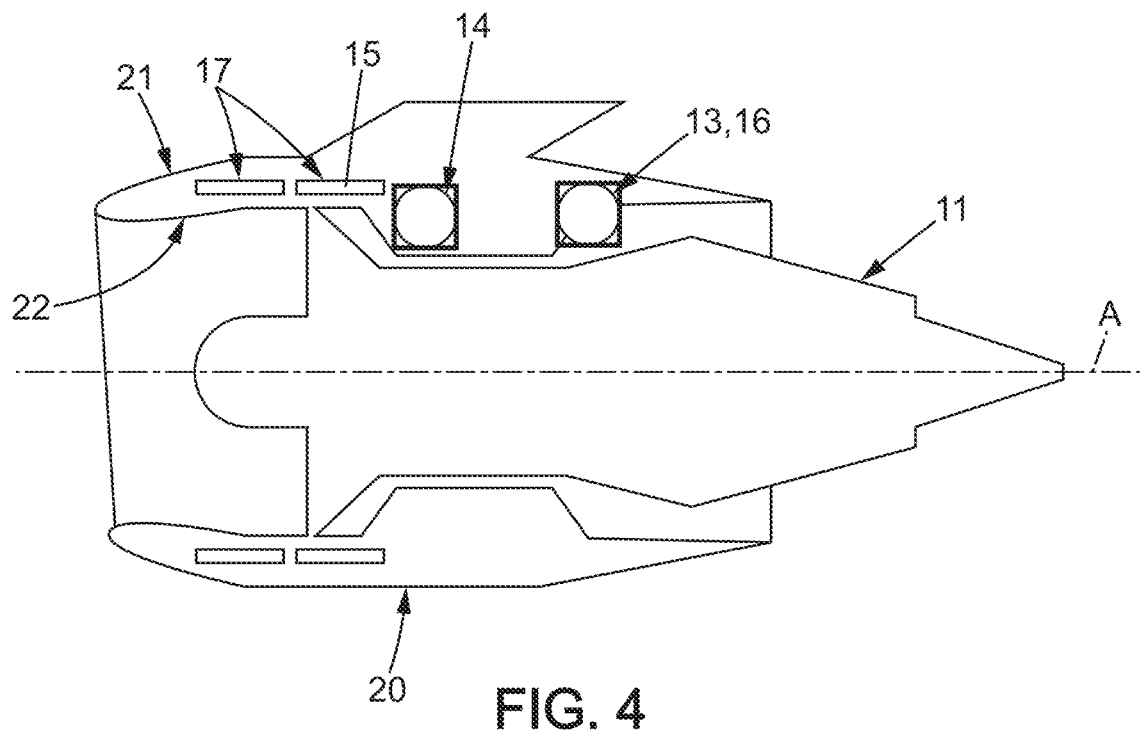
FIG. 4 is a schematic axial section view of a propulsion assembly comprising a nacelle and the turbine engine of FIG. 2.

As shown in FIG. 4, the energy storage assembly is fully integrated out of the aircraft area, and in particular is fully enclosed in a nacelle 20 carrying turbine engine 11 and forming with turbine engine 11 a self-contained hybrid propulsion assembly.

Supercapacitors 15 are arranged circumferentially around a main axis A of turbine engine 11. This makes it possible to reduce the length of the connections and therefore the total mass of the system, as well as to reduce the energy losses in said connections.

Supercapacitors 15 are in particular prismatic in shape and are distributed to form two pairs 17 of concentric circles in nacelle 20. Said circles of supercapacitors 15 are in particular comprised radially between an external casing 21 and an internal casing 22 of said nacelle 20, and are centered on the main axis A.

Such a flattened shape of capacitors 15 makes it possible to obtain a thickness of a few centimeters (on the order of 5 cm in the example above), which is compatible with the aerodynamic dimensions of nacelle 20.

Placing supercapacitors 15 in nacelle 20 is advantageous, since they benefit from a favorable thermal environment (unlike the temperatures in the engine which can reach several hundred degrees) that is compatible with supercapacitors.

The power electronics may be positioned within the compartment in nacelle 20. Power feed device 13 is conventionally positioned on an accessories gearbox (AGB), and converter 14 may advantageously be positioned in various locations situated between supercapacitors 15 and power feed device 13.

Figure 5:
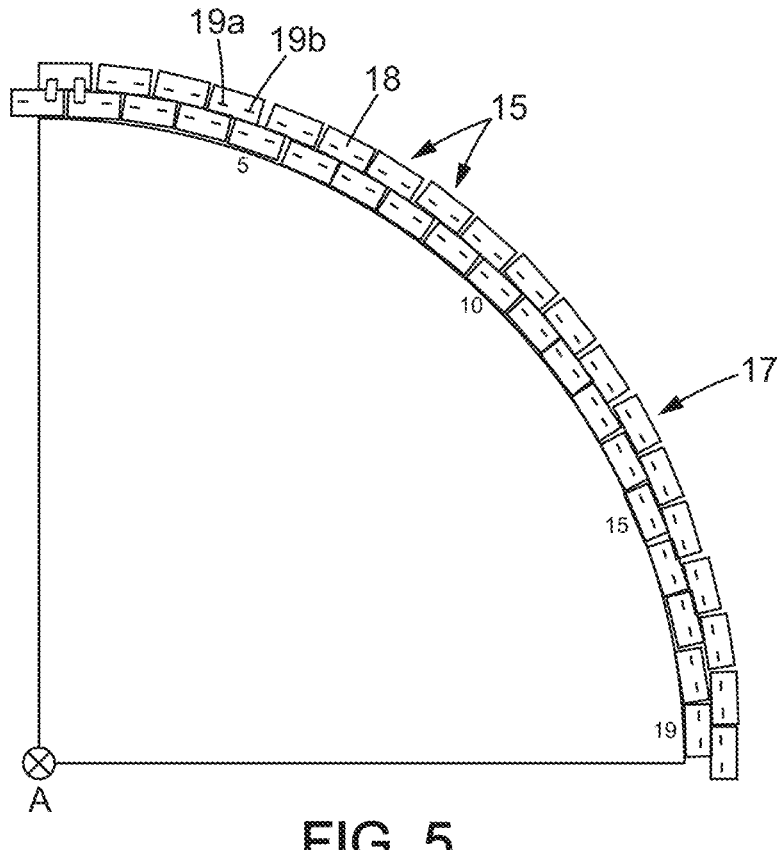
FIG. 5 is a schematic radial section view of the energy storage assembly of FIG. 3.

One of pairs 17 of circles is shown in detail in FIG. 5, in section view in a plane orthogonal to the main axis A.

Supercapacitors 15 of the radially outer circle are circumferentially offset, relative to the supercapacitors of the radially outer circle, by half the circumferential width of supercapacitors 15.

Each supercapacitor 15 has a substantially parallelepipedal shape with an axial connection face 18 comprising a first connector 19a referred to as the input connector and a second connector 19b referred to as the output connector.

Thus, for each pair of circles 17, input connectors 19a of supercapacitors 15 of each circle are located radially in line with output connectors 19b of capacitors 15 of the other circle.

Input connectors 19a and output connectors 19b of each capacitive component 15 of each of the circles are respectively connected to output connectors 19b and input connectors 19a of capacitive components 15 of the other circle, with the exception of a first component 15a and a last component 15b of the pair of circles 17.

First and last components 15a, 15b of each pair of circles 17 are capacitive components 15 by which the capacitive half-unit formed by components 15 of the pair of circles is connected to the other half-unit or to the converter 14.

This allows connecting in series all capacitors 15 of the pair of circles 17, with interconnections of minimal length. The interconnections connecting input connectors 19a to output connectors 19b are in particular of the busbar type, and extend radially. This allows reducing the inductance and total resistance of the interconnections.

Figure 6:
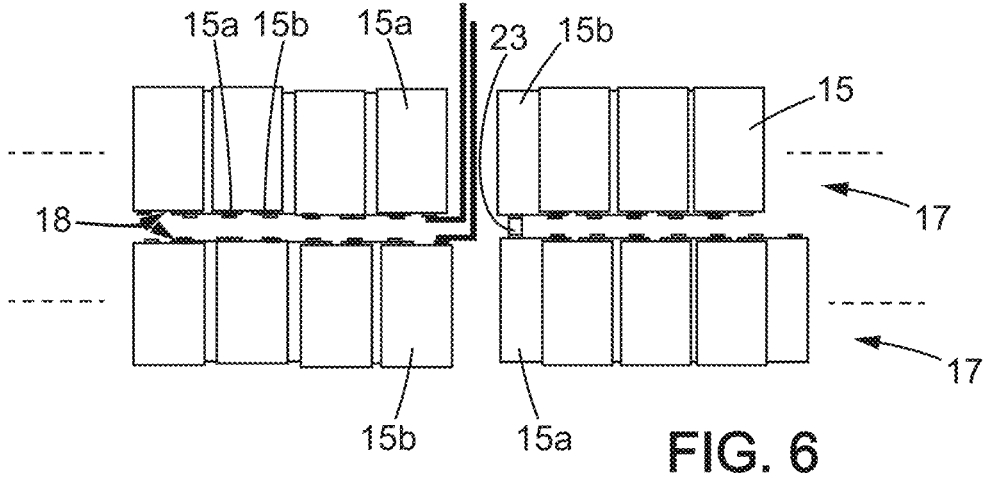
FIG. 6 is a schematic top view of the energy storage assembly of FIG. 5.

In addition, as shown in FIG. 6, the offset arrangement of the concentric circles allows the interconnections of supercapacitors 15 of each pair 17 of circles to be placed axially facing each other. A simple interconnection 23 between the two pairs of circles 17 facing each other allows the two "half-units" of capacitors 15 to be connected at their midpoint.

By means of this arrangement, the axially facing interconnections have opposite directions of current flow, one radially "upward" when the other is radially "downward" (the terms upward and downward being relative to the direction of flow of the current, respectively away from the main axis A and towards the main axis A). This has the effect that the magnetic fields created by these facing interconnections are in opposition and tend to cancel each other out, which results in a significant reduction in the wiring inductance.

Figure 7:
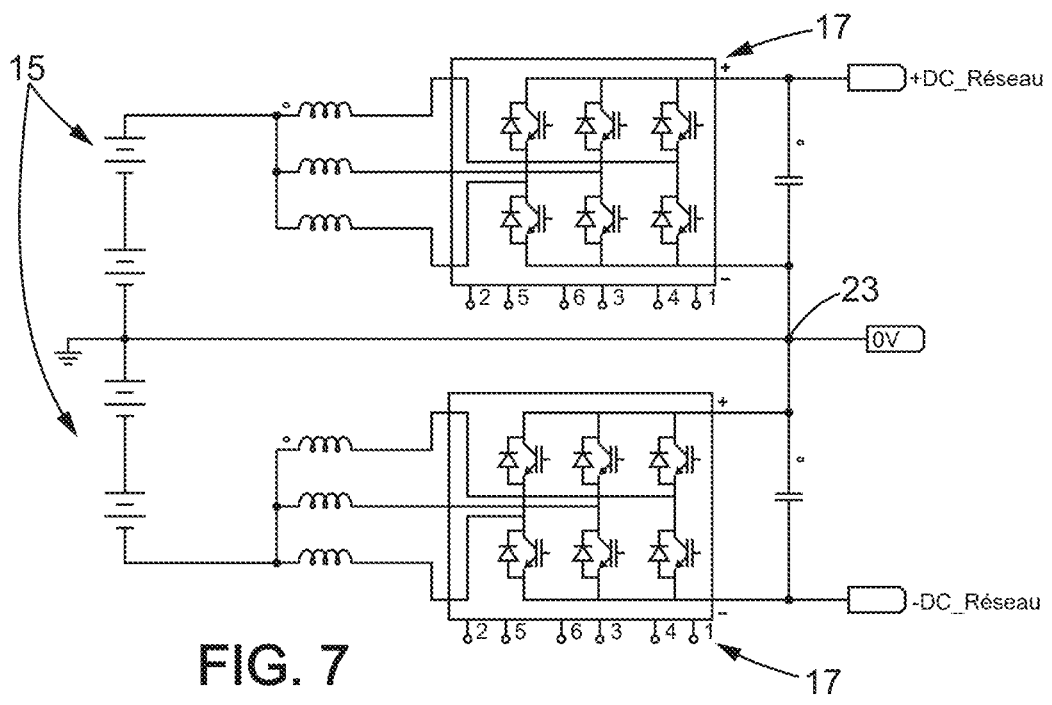
FIG. 7 is an electrical diagram of an energy storage assembly according to another embodiment of the invention.

According to a variant shown in FIG. 7, the interconnection 23 between the two pairs of concentric circles 17 may be electrically connected to the body of the aircraft in order to create a potential reference, and/or be connected to the aircraft's electrical network in order to serve as a ground reference.

Figure 8:
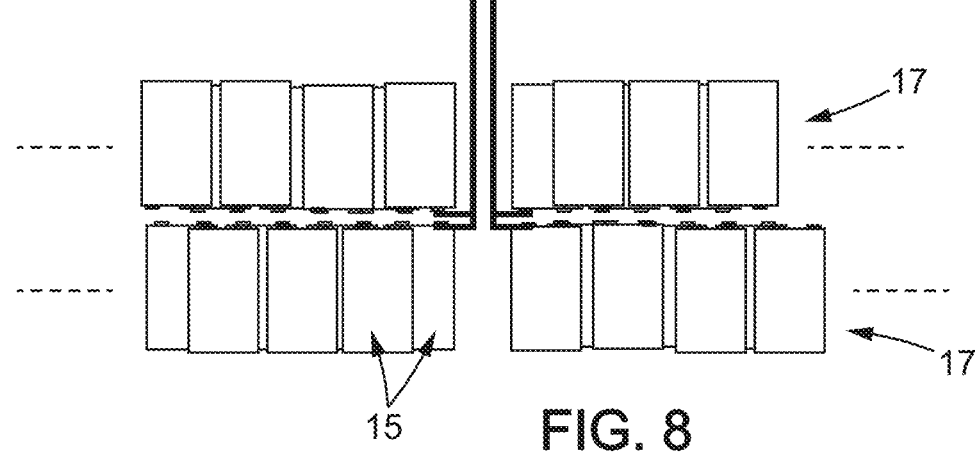
FIG. 8 is a schematic top view of an energy storage assembly according to another embodiment of the invention.

According to another variant shown in FIG. 8, the two half-units formed by capacitors 15 of each of the two pairs of circles 17 may be connected in parallel, to make the system compatible with a 540V (+/–270V) system or a 230/400 VAC system with fixed or variable frequency. In this case, the second half-unit must be offset in order to continue to ensure the effect of canceling out the magnetic fields between the various interconnections of capacitors 15.

Alternatively, the supercapacitors may be adapted for longer engine cycles, up to 5 s, with power limited to 200 kW. This type of cycle is typically compatible with electrochemical double layer supercapacitors (also called EDLCs). Capacitors of this type can increase the cycle time up to 10 s, provided that an increase in storage volume is acceptable.

It would also be possible to further increase the cycle time up to 20 s or 30 s by using hybrid supercapacitors (also called LICs, for Lithium Ion Capacitors), provided that a preheating system is added or the capacitors are moved closer to the turbine engine, to ensure a temperature above –10° C.

The invention claimed is:

1. A twin-spool turbofan type of turbine engine for an aircraft, the turbine engine having a main axis and comprising a low-pressure compressor, a high-pressure compressor, a combustion chamber, a high-pressure turbine, and a low-pressure turbine, said low-pressure turbine being connected to said low-pressure compressor by a rotating low-pressure shaft centered on the main axis and said high-pressure turbine being connected to said high-pressure compressor by a rotating high-pressure shaft centered on the main axis, the turbine engine also comprising a mechanical power feed device on at least one of the rotating high-pressure shaft and the rotating low-pressure shaft, wherein the turbine engine comprises capacitive components adapted to supply the turbine engine with electrical energy through said mechanical power feed device, said capacitive components being arranged in at least one pair of concentric circles on a support structure of the turbine engine, said at least one pair of concentric circles being centered on the main axis of the turbine engine, each circle of the at least one pair of concentric circles being radially adjacent, wherein, for the at least one pair of concentric circles, the capacitive components of a radially inner circle of the at least one pair of concentric circles are arranged so as to be circumferentially offset by half the circumferential width of the capacitive components, relative to the capacitive components of a radially outer circle of the at least one pair of concentric circles.

2. The turbine engine according to claim 1, wherein the capacitive components are supercapacitors.

3. The turbine engine according to claim 1, wherein the capacitive components are connected in series and have an equivalent resistance that is less than or equal to 100 Ohm per capacitive component.

4. The turbine engine according to claim 1, wherein each capacitive component comprises an input connector and an output connector which are arranged on a same axial connection face of the capacitive component, the axial connection faces of the capacitive components of the at least one pair of concentric circles being oriented in a same axial direction.

5. The turbine engine according to claim 4, wherein, for the at least one pair of concentric circles, the input connector of each capacitive component in the radially outer circle is connected to the output connector of a capacitive component in the radially inner circle, and the output connector of each capacitive component of the radially outer circle is connected to the input connector of a capacitive component of the radially inner circle, with the exception of a first capacitive component and a last capacitive component of the pair of concentric circles.

6. The turbine engine according to claim 4, wherein the capacitive components are arranged in at least two pairs of concentric circles, the axial connection faces of the capacitive components of a first pair of the at least two pairs of concentric circles being arranged facing the axial connection faces of the capacitive components of a second pair of the at least two pairs of concentric circles.

7. The turbine engine according to claim 1, wherein the capacitive components are arranged in at least two pairs of concentric circles, a first pair of the at least two pairs of concentric circles being electrically connected to a second pair of the at least two pairs of concentric circles in series by an interconnection.

8. The turbine engine according to claim 7, wherein the interconnection between the first pair of the at least two pairs of concentric circles and the second pair of the at least two pairs of concentric circles is adapted to be electrically connected to an aircraft body in order to create a potential reference, and/or be connected to an aircraft electrical system in order to serve as a ground reference.

9. The turbine engine according to claim 6, wherein the capacitive components are arranged in at least two pairs of concentric circles, the capacitive components of each pair of concentric circles of the at least two pairs of concentric circles being connected in series with each other, each pair of concentric circles of the at least two pairs of concentric circles being connected in parallel with each other pair of concentric circles of the at least two pairs of concentric circles.

10. A propulsion assembly for aircraft, comprising the turbine engine according to claim 1 and at least one nacelle receiving the turbine engine, the at least one pair of concentric circles of capacitive components being arranged in a space delimited radially between an inner casing and an outer casing of the nacelle.

* * * * *